Patented June 8, 1954

2,680,725

UNITED STATES PATENT OFFICE 2,680,725

COATING COMPOSITION

Charles Di Battista and Egidio James Di Battista, Cranford, N. J.

No Drawing. Application July 18, 1952,
Serial No. 299,751

6 Claims. (Cl. 260—23.7)

The present invention relates to coating compositions especially adapted for use in the coating of masonry surfaces. More particularly, the invention provides improved coating compositions useful for decorating masonry surfaces and rendering such surfaces more water-repellent.

There are described in Patent No. 2,460,878 coating compositions especially adapted to the coating and decorating of asbestos shingles, concrete, stucco and other materials containing free lime, as well as brick and stone, and comprising an aqueous solution of potassium silicate as a vehicle and containing 8 to 11 pounds, per gallon of vehicle, of a composite mixture composed of 40% to 70% of silica, 25% to 40% of barium sulfate, 5% to 20% of titanium oxide and 1% to 4% of glycerine.

It is an object of our present invention to produce coating compositions of the type and for the purpose therein described but with reduced superficial hardness, which are more tacky and less brittle, which will adhere more strongly to the masonry or other surfaces and render them more water-repellent. These and other objects are accomplished by our present invention.

We have discovered that a coating composition having these and other desirable properties may be produced by omitting the glycerine from the composition of the said patent and adding to the composition about 4% to 10% based on the volume of the composition of an emulsion composed of about equal proportions by volume of a rubber latex and an oil.

The latex may be either a natural rubber latex or a synthetic rubber latex, one resulting from the copolymerization of styrene and butadiene, for instance. We have, with advantage, used for this purpose either a natural or synthetic rubber latex containing about 60% solids by weight, and the proportions of latex herein described are based on a solid content of that order. However, latices of either greater or lesser solid content may be used, the quantities being proportionately increased or decreased to give an equivalent amount of solid.

The nature of the oil used in preparing the oil-latex emulsion is subject to wide variation. Most any kind of vegetable, or animal oil, may be used, either a drying oil or a non-drying oil, for instance, fish oil, linseed oil, soybean oil, castor oil or the like.

The choice of the oil depends primarily upon the desired properties of the coating composition and its intended use, especially whether the resulting emulsion is to be used in a white coating or a colored coating. In preparing a white coating, for instance, we prefer to use a vegetable oil, such as soybean oil, or castor oil. For colored coatings, fish oil is generally preferred.

In preparing colored coatings, we have also, with advantage, included in the composition minor proportions of oleic acid and triethanolamine, the proportions varying within the ranges of about 1 to 5% of oleic acid and 1 to 3% of triethanolamine, based on the total volume of the emulsion. White coating compositions have a tendency to discolor where oleic acid and triethanolamine are included and for that reason their presence in white coating compositions is usually undesirable.

As previously stated herein, in preparing the emulsion, it is usually desirable to use about equal volumes of the oil and the latex, assuming that the latex is one containing about 60% solids. The latex and oil are readily emulsified by vigorous stirring either with or without the oleic acid and triethanolamine. Where the oleic acid and triethanolamine are used they are, with advantage, incorporated in the emulsion before it is added to the potassium silicate suspension.

The potassium silicate suspension may be prepared as described in the previously mentioned patent, except that the glycerine is omitted and thereafter the oil-latex emulsion, in proportions within the previously indicated range, is mixed with the resultant potassium silicate suspension. Where a colored coating composition is desired, an alkali stable dye or a mixture of such dyes may be added either to the potassium silicate suspension before the oil-latex emulsion is added thereto, or the dye may be added to the composite mixture.

As described in said patent, the vehicle is an aqueous solution of potassium silicate, advantageously of 15 to 25° Baumé. There is mixed with this vehicle about an equal weight of a composite pigment mixture of silica, barium sulfate, and titanium oxide. We have, with particular advantage, used as the silica constitutent a 200 mesh silica marketed as "Silex White." Particularly desirable results have been obtained by the use of a composite pigment of the following composition:

| | Parts |
|---|---|
| Silica | 60 |
| Barium sulfate | 27.5 |
| Titanium oxide | 10 |

However, the composition of the pigment mixture is subject to considerable variation within the ranges set forth in the following tabulation:

| | Parts by weight |
|---|---|
| Silica | 40–70 |
| Barium sulfate | 25–40 |
| Titanium oxide | 5–20 |

Using the pigment mixture and the foregoing tabulation in proportions of about 8 pounds of the mixture per gallon of the potassium silicate has given especially advantageous results. However, the pigment mixture may be used in proportions within the range extending from about 8 pounds per gallon to about 11 pounds per gallon of the potassium silicate.

As specific examples of coating compositions contemplated by the present invention, the following examples are given. It will be understood, however, that the invention is not restricted to the particular proportions shown in these examples nor to the particular oils and latices used therein.

Example I

There was added to a 20° Bé. aqueous solution of potassium silicate an equal weight of a pigment mixture of the following composition:

| | Parts by weight |
|---|---|
| Silica | 60 |
| Barium sulfate | 27.5 |
| Titanium oxide | 10 |

To the resultant suspension there was added about 5% by volume of an emulsion composed of equal volumes of soybean oil and a synthetic rubber latex prepared by copolymerizing styrene and butadiene and containing about 60% solids.

Example II

To a suspension prepared as in Example I, there was added 10% by volume of an emulsion composed of equal volumes of fish oil and the latex of Example I and to which there was added 3% of triethanolamine, 5% of oleic acid and a minor proportion of an alkali-stable dye.

We claim:

1. A coating composition comprising an aqueous solution of potassium silicate of 15° to 25° Bé. as a vehicle and containing about 8 to about 11 pounds, per gallon of vehicle, of a composite pigment mixture composed of the following materials in proportions by weight within the indicated ranges:

| | Parts |
|---|---|
| Silica | 40 to 70 |
| Barium sulfate | 25 to 40 |
| Titanium oxide | 5 to 20 | and 4% to 10%, based on the volume of the composition of an emulsion composed of about equal proportions by volume of a rubber latex and an oil of the class consisting of animal and vegetable oils.

2. The composition of claim 1 which also contains 1% to 5% oleic acid and 1% to 3% triethanolamine, based on the total volume of the emulsion.

3. The composition of claim 2 in which the oil constituent is fish oil.

4. The composition of claim 1 in which the latex constituent is one containing about 60% solids.

5. The composition of claim 4 in which the latex constituent is synthetic latex resulting from the copolymerization of styrene and butadiene.

6. The composition of claim 4 in which the latex constituent is a natural rubber latex.

References Cited in the file of this patent

UNITED STATES PATENTS

| Number | Name | Date |
|---|---|---|
| 2,460,878 | Di Battista et al. | Feb. 8, 1949 |

OTHER REFERENCES

Rinse, Paint Technology, Feb. 1952, pages 55–59 and 65.